United States Patent [19]
Nitsch

[11] Patent Number: 4,787,578
[45] Date of Patent: Nov. 29, 1988

[54] WEIGHT COMPENSATING MECHANISM PARTICULARLY FOR AIRCRAFT HATCHES, DOORS OR GATES

[75] Inventor: Dieter Nitsch, Delmenhorst, Fed. Rep. of Germany

[73] Assignee: MBB GmbH, Bremen, Fed. Rep. of Germany

[21] Appl. No.: 25,268

[22] Filed: Mar. 12, 1987

[30] Foreign Application Priority Data

Mar. 15, 1986 [DE] Fed. Rep. of Germany ....... 3608735

[51] Int. Cl.$^4$ ............................................. B64C 1/14
[52] U.S. Cl. .................... 244/129.5; 49/386; 49/379; 16/75; 16/289
[58] Field of Search ............ 244/129.5; 49/386, 379; 16/75, 289

[56] References Cited

U.S. PATENT DOCUMENTS

| | | | |
|---|---|---|---|
| 2,602,957 | 7/1952 | Anderson | 49/386 |
| 3,146,847 | 9/1964 | Rutman et al. | 267/278 |
| 3,421,262 | 1/1969 | Floehr | 49/386 |
| 4,223,483 | 9/1980 | Stafford | 49/386 |
| 4,465,156 | 8/1984 | Richardson et al. | 267/278 |
| 4,601,446 | 7/1986 | Upsahl | 49/386 |

Primary Examiner—Galen Barefoot
Attorney, Agent, or Firm—Ralf H. Siegemund

[57] ABSTRACT

Weight compensation for hinged doors, hatches, gates, or the like, which swing up and down on an upper horizontal hinge axis, comprises a torsion rod extending parallel to the hinge axis and having hollow shafts or bushings at its respective ends, one of the bushings is connected through a lever and a continuously length adjustable rod to the frame and on one side of said door, hatch, or gate, the other bushing is mounted to a lever, and a continuously adjustable tensioning screw fastens that lever to the door, hatch, or gate, and at the other side thereof.

2 Claims, 2 Drawing Sheets

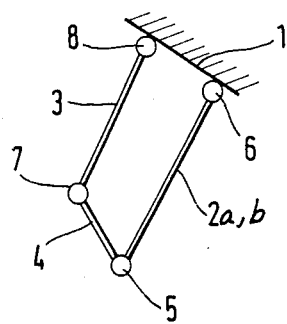
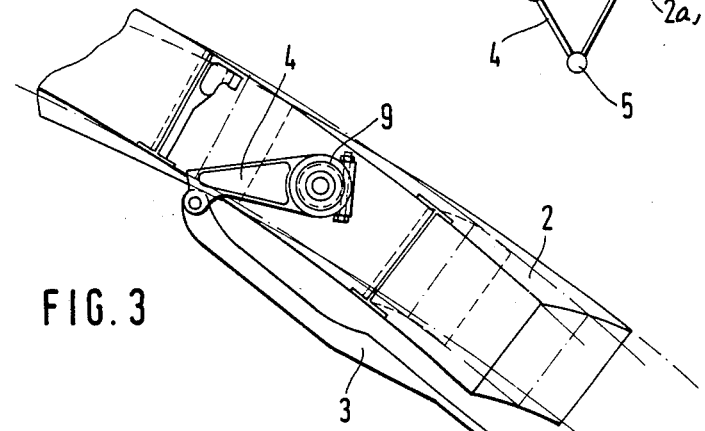
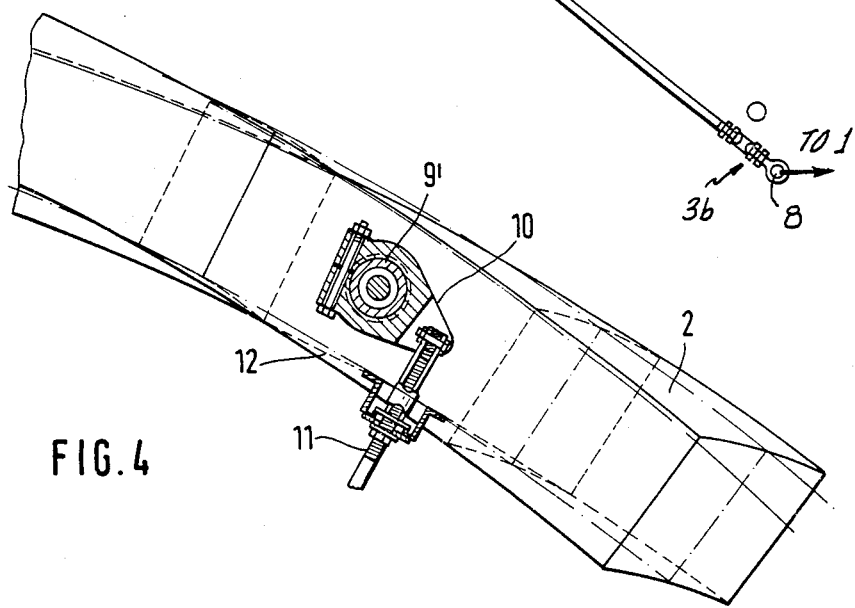

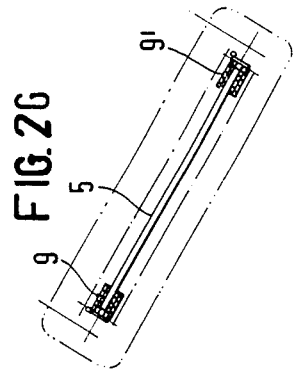
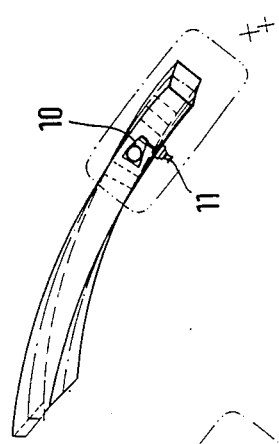
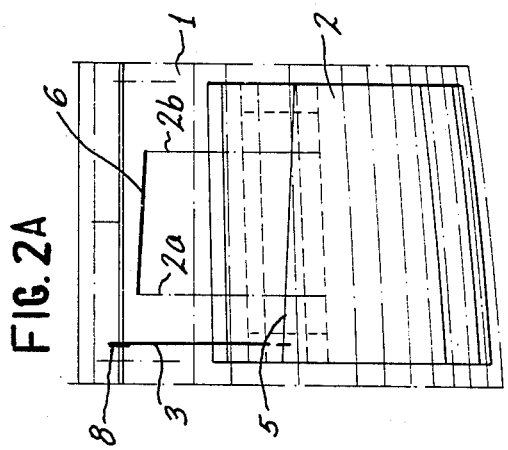
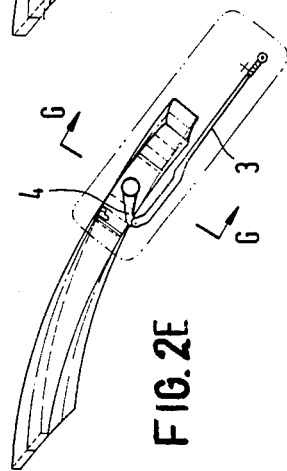
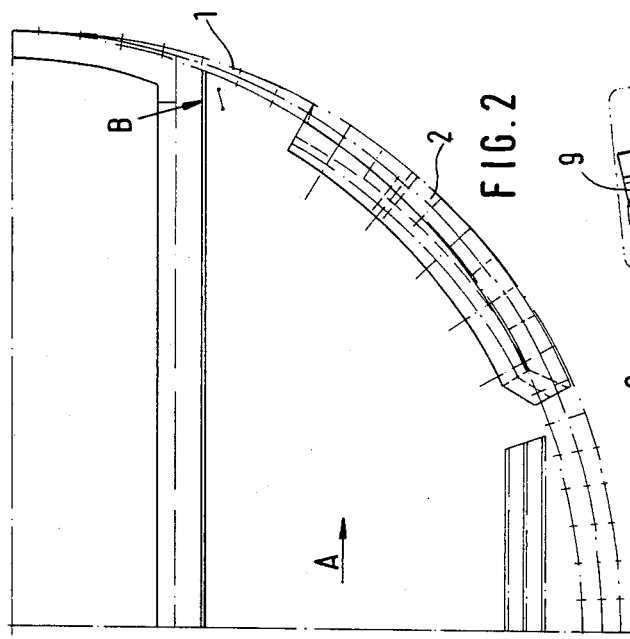
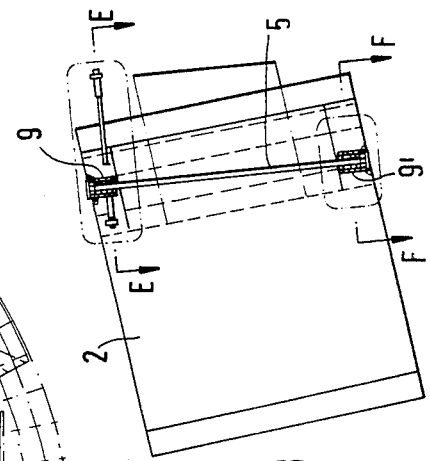

WEIGHT COMPENSATING MECHANISM PARTICULARLY FOR AIRCRAFT HATCHES, DOORS OR GATES

BACKGROUND OF THE INVENTION

The present invention relates to a freight and cargo door, hatch or gate with weight compensation, particularly, the invention relates to a weight balanced hatch, door or gate for the cargo space in an aircraft.

Gates, doors, hatches, or the like for vehicles, particularly aricraft, are usually provided to be opened from the inside, as well as from the outside, for easy and free access into the interior of the vehicle. These gates etc. are sometimes referred to as plug-type gates. The gates, doors or hatches of this type are usually very heavy and, in order to facilitate opening of them by operating personnel, certain aids are provided in a mechanical and/or electrical fashion for assisting in the opening and closing of the gates, doors or hatches. These assist structures are usually built into the gate itself or are generally a part of the vehicle.

Known mechanical opening and closing assist devices and structures are usually comprised of resilient elements in various configurations which, particularly during opening of the door, gate or hatch, aid in the opening movement and/or, in some fashion, balance or compensate the weight or mass of the door, gate or hatch. Electrical aiding and assist structures for this purpose usually work, also in conjunction with electromotors and electronic circuitry for the control of such a motor. Examples of this kind of arrangement are shown, for example, in European Pat. Nos. 105,082 or 114,324, or in German printed patent application No. 29 07 550.

These known structures for aiding and assisting opening and closing of gates, doors, hatches, or the like, are disadvantaged by the simple fact that an electric current and power supply is needed, and owing to the heavyness that is involved, the current needed is quite substantial. Moreover, it was found that due to the heaviness and complexity in the structure and design involved in such an electrically operated door, gate, or hatch mechanism, they are prone to interference and break-down, actually to a larger extent than mere mechanical devices.

Mechanical opening and closing structures using springs of various kinds, on the other hand, require additional features and equipments such as attenuating elements, particularly, if the support of the opening of the gate, door, or hatch, is not to involve or produce accellerated physical movement of the rather heavy parts. This is particularly necessary in order to avoid that operating personnel be endangered by too fast, for example, a swinging up of the gate. On the other hand, if the mechanical devices aiding in the opening and closing of such a gate, hatch or door, merely compensates the weight of the device being opened, for example, under utilization of a coiled spring, structures or the like, then the danger exists that, e.g. the spring twists and is no longer sufficiently operative.

DESCRIPTION OF THE INVENTION

It is an object of the present invention to provide a new and improved facility for aiding in the opening and closing of a cargo hatch, door, or gate, which avoids the problems outlined above.

It is a psecific object of the present invention to propose a new and improved mechanical weight balancing mechanism for aircraft dargo doors or the like.

In accordance with the preferred embodiment of the present invention, the object is attained in that the weight of the gate, door, or hatch, is compensated through the operation and on the basis of a torsional rod, such that for opening and closing the freight gate, hatch, or door, it is merely necessary to manually overcome the frictional forces that are incurred in the operation. Particularly, it is suggested to provide the torsional rod, such that its axis runs parallel to the hinge axis of the gate, door, or hatch. Both ends of the rod are received by and in hollow shafts, sleeves, or bushings which are, respectively, connected to one side of the gate, hatch, or door, and to the frame on the opposite side of the door, etc., in order to take up torsional forces. One of the hollow shafts, sleeves, or bushings, is connected to the frame of the door, gate, or hatch via a lever and a continuously adjustable rod, while the other hollow shaft, sleeve, or bushing is connected to the freight door, gate, or hatch, via a lever and a continuously adjustable tension screw.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a schematic view indicating basically the kinematics involved in the weight balancing and compensating mechanism functioning and operaing on the principle for the preferred embodiment of the present invention for practicing the best mode thereof;

FIG. 2 is a schematic cross-section through a cargo or freight hatch, door, gate, in which the preferred embodiment of the present invention is practiced;

FIGS. 2A, 2B, 2E, 2F, and 2G are, respectively, views of portions of the gate, door, or hatch structure, shown in FIG. 2, the views and sections being indicated appropriately by the letters A, B, E—E, F—F, and G—G;

FIG. 3 illustrates in perspective view the fastening of the gate, hatch, or door, by means of a hollow shaft. sleeve, or bushing and being part of the structure shown in FIG. 2; and FIG. 4 illustrates the fastening of the gate, hatch, or door, by means of another hollow shaft, sleeve, or bushing.

Proceeding now to the detailed description of the drawings, FIG. 1, as stated, illustrates the kinematics and dynamics of the weight compensating mechanism, practiced in accordance with the preferred embodiment of the invention. Herein then, reference numeral 1 refers schematically to the frame of a door, gate or hatch being held on a hinge 6 by means of rods 2a and 2b. Only these rods are kinematically effective. That door is then hinged by means of the rods to a conventional pivot hinge 6. A hinge 5 between the front end of the gate or door 2, carrying rods a and b, is established by a torsion rod. A lever 4, on the other hand, is, in addition, linked through regular pivot link 7 to a rod 3 which, in turn, is pivotally linked to the door frame 1 by a hinge or pivot 8. This overall configuration was chosen so that the torque acting on the hinge 6 on account of the weight of the gate 2, and the torque of the torsion provided by the torsion of the rod-hinge 5, compensate each other as far as acting on the door is concerned to be effective, particularly in each and every position of the door 2.

A stated earlier, FIGS. 2 and 2A through 2G illustrate various aspects of the door 2, in conjunction with frame 1. Herein, FIG. 2 illustrated broadly a section through the lower part of the fuselage of an aircraft of which the door 2 is the cargo hatch. The frame 1 is, in effect, an extension or part of the fuselage body itself. FIG. 2, in addition, illustrates by way of the two arrows A and B the two views of FIGS. 2A and 2B. Herein, FIG. 2A shows the hinge 6 for the door and the suspending rods 2a and 2b. Also shown is the torsion rod 5 and its linkage (3, 8) to the frame 1. FIG. 2B shows in particular that the ends of torsion rod 5 are connected with, and inserted in two hollow shafts, sleeves, or bushings 9, 9', respectively. These are, respectively, supported in the front or forward and the rear door frame portion, wherein forward and rear relate to the normal orientation of the aircraft. The axis of torsion rod 5, as well as the axis of the hollow shafts 9 and 9', are coaxial and run parallel to the hinge axis 6 of the gate or door 2.

FIG. 3 is, in fact, an enlargement of FIG. 2E, and the relationship to the remainder of the structure can be seen from the section lines E—E in the view B of FIG. 2B, and its orientation is, as stated, shown by arrow B in FIG. 2. Here then is shown in greater detail the frontal side hollow shaft, sleeve, or bushing 9, as connected to the gate or door 2, showing in particular the connection of that hollow shaft 9 to the door frfame under utilization of the lever 4, on one hand, and a rod 3, on the other hand. As indicated by 3a, rod 3 is continuously length adjustable.

Analogously, FIG. 4 is an enlarged view of FIG. 2F, which is identified by the section lines F—F in FIG. 2B. FIG. 4 shows the rear hollow shaft, sleeve or bushing 9', as it is mounted to the gate or door 2 as follows. Sleeve 9' carries a lever 10, and that lever 10, in turn, is secured by means of a tensioning screw 11 in relation to the gate structure detail 12.

The length of the tension screw 11, as well as the length of the rod 3, is in each instance and independently from each other continuously adjustable. Upon changing the length of tension screw 11, the tension bias of rod 5 is modified. On the other hand, any length change in rod 3 permits the effective adjustment of the weight compensation at the respective point. Both features, in fact, permit matching of the tolerances as far as dimensions and weight of the freight door, hatch, or gate are concerned, in conjunction with the overall effectiveness of the weight balancing mechanism.

The invention is not limited to the embodiments described above, but all changes and modifications thereof, not constituting departures from the spirit and scope of the invention, are intended to be included.

I claim:

1. Cargo or freight hatch, door, or gate, including a weight compensation mechanism, the gate, door, or hatch being of the plug-type that can be opened towards the inside, there being a hinge axis to swing the door, gate, or hatch upwardly, comprising in combination:

a torsion rod arranged parallel to the hinge axis of the gate, door, or hatch, there being hollow shafts or sleeves at the ends of the torsion rod, both sleeves being secured to the torsion rod;

one of said sleeves being connected to a door frame by means of a lever that is not a continuation of the torsion rod, and a further length adjustable rod; and the other one of the sleeves being connected to a further lever, said further lever being connected to the door, gate, or hatch through a adjustable tension screw.

2. Weight compensation for hinged doors, hatches, gates, or the like, which swing up and down on an upper horizontal hinge axis, comprising:

a torsion rod extending parallel to said hinge axis having hollow shafts, sleeves, or bushings at its respective ends being secured thereto;

one of the bushings being connected through a lever and a length adjustable rod to the door frame on one side of said door, hatch, or gate; and the other one of said shafts or sleeves being mounted to a lever, there being an adjustable tensioning screw for fastening to said door, hatch, or gate, at the other side thereof.

* * * * *